Sept. 20, 1971          D. J. HILL          3,606,387

SELF-ADJUSTING CLOSE-COUPLED TRAILER HITCH

Filed May 29, 1969          4 Sheets-Sheet 1

INVENTOR.

D. JAMES HILL

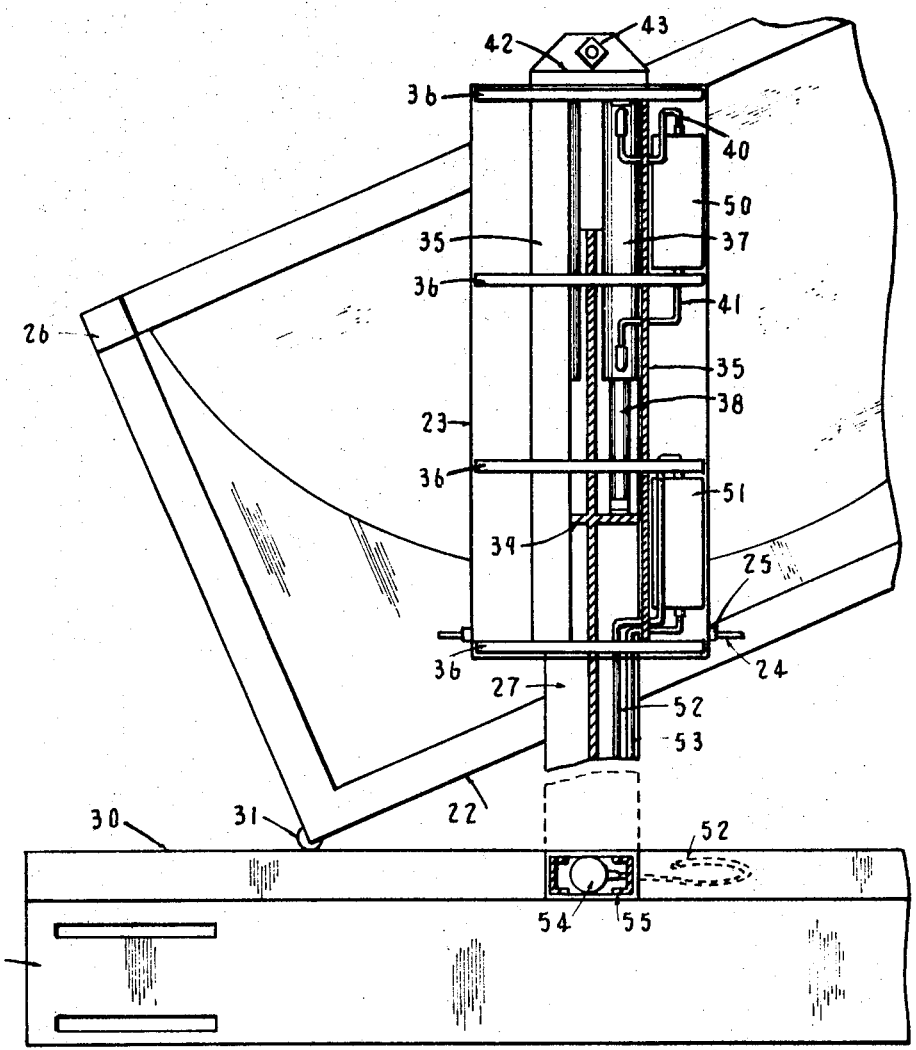
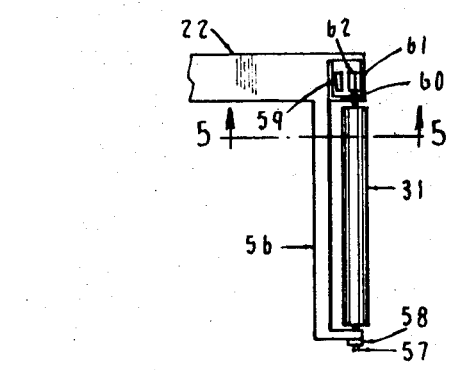
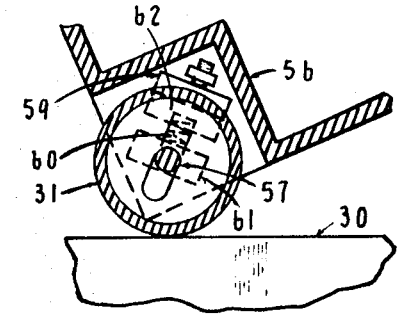
FIG. 3
FIG. 4
FIG. 5
INVENTOR.
D. JAMES HILL

Sept. 20, 1971 D. J. HILL 3,606,387
SELF-ADJUSTING CLOSE-COUPLED TRAILER HITCH
Filed May 29, 1969 4 Sheets-Sheet 3

INVENTOR.
D. JAMES HILL

INVENTOR.
D. JAMES HILL

United States Patent Office 3,606,387
Patented Sept. 20, 1971

3,606,387
SELF-ADJUSTING CLOSE-COUPLED
TRAILER HITCH
Delmer James Hill, Grosse Pointe Woods, Mich.
(3133 Cortland Drive, Vestal, N.Y. 13850)
Filed May 29, 1969, Ser. No. 828,943
Int. Cl. B62d 53/00
U.S. Cl. 280—446    7 Claims

ABSTRACT OF THE DISCLOSURE

A device for towing mobile and sectional homes in a close-coupled manner when the longitudinal axes of towing vehicle and trailer are aligned, and automatically spacing the proximate surfaces of said towing vehicle and trailer in a turn, either way, up to 90°, to the extent necessary to preclude contact between said proximate surfaces.

---

This invention relates generally to trailer hitches, more particularly to a hitch that is installed on the towing vehicle rather than on the trailer. Still more particularly, it concerns a horizontally telescoping hitch responsive to sensors and rotatable about a generally vertical axis.

The evolution of small scale construction from on-site fabrication to production-line assembly is a foregone conclusion. Technological advances in the factory-built shelter industry have been somewhat less impressive than the industry's growth, especially in the area of delivery appurtenances.

During the industry's early years in the 40's, the great preponderance of factory-built structure was truly travel-trailer in size and character, and permanently attached jacks, tongues and subordinate steel structure to support those tongues in-transit were appropriately developed. As the industry and trailer grew in size, those delivery appurtenances grew in size and complexity.

Contemporary factory-built structure may be generally classed as those of a recreational vehicle nature, of a scale and character of most factory-builts of the 40's, and those of a permanent nature, 12 and 14 feet in width, 55 to 70 feet in length, and 6 to 12 tons in net weight. Whether built as homes, as classrooms or for other use, these huge structures are seldom, if ever, moved from the site they are placed upon when arriving from the factory.

Present delivery appurtenances consist primarily of two types. The majority of the factory-built shelter units presently being manufactured have greatly enlarged versions of the 40's trailer delivery hitch permanently attached to their lower front end. Most of the remaining factory-built shelter units presently being manufactured have detachable versions of that same massive assembly which has grown ever bigger since the industry's early days of often-moved trailers.

Criticism of either the permanently attached or the detachable delivery appurtenance is two-fold.

The hitch, protruding 3 to 4 feet from the front end of a structure, permanently attached, and used only a few hours to pull that structure to a permanent or semi-permanent site, is neither economically feasible or esthetically desirable.

The detachable hitch, on the other hand, takes up valuable and limited storage space if retained by the buyer who foresees the possible future movement of his structure, and who realizes that the lack of industry hitch standards and changing manufacturing details may force him to a later custom and very costly hitch if he returns his detachable original delivery hitch to the manufacturer for credit.

If the buyer of the structure gambles on the permanency of its siting and returns the hitch to the manufacturer, he only receives partial credit for the hitch, it is difficult to handle, expensive to ship, and is often damaged when received by the manufacturer, necessitating repairs and limiting the number of times it may be reused.

Further, both permanently attached and detachable hitches are subject to damage during the original and subsequent deliveries, as the hitches are immovable objects meeting the irresistible force of the hitch-ball-supporting steel structure on the hauling vehicle under certain common turning conditions.

Perhaps more important to an industry selling enclosed space is the 3 to 4 feet lost to conventional hitches, both permanent and detachable. Highway maximum length laws in most states limit the overall length of hauling vehicle and trailer to 75 feet and a maximum trailer length of 60 feet. Thus, the shelter structure is limited to 56 to 57 feet. Obviously, therefore, the elimination of the delivery appurtenances as a protuberance on the front end of the structure, and the attaching to the towing vehicle of a close-coupling but telescoping means of towing the trailing structure will allow the manufacture and legal delivery of structure that is 3 to 4 feet longer.

In short, the above described changes in delivery appurtenances will make it possible to legally tow 5 to 7 percent more enclosed space per trip.

In addition, conventional hitches contain, in the manually cranked jack, the only presently attached means of vertically adjusting the structure hook-up point for attachment to the towing vehicle. This jack is difficult, often extremely difficult to operate, and its operation is very time consuming. The "throw-away" nature of the jack, engineered as it is for very limited operation, and the attendant required low cost, preclude the quality construction necessary to vertically adjust the tremendous hitch weights of contemporary factory-built structure. It is not uncommon for 1 or 2 hydraulic jacks to be employed by delivery drivers during hook-up to assist in this task.

It is, however, possible to quality engineer and quality build a non-manual mechanism to vertically adjust the great weight of the end of such structures during hook-up to the towing vehicle, if said mechanism is a part of the towing vehicle and intended for thousands of use cycles.

It should be pointed out that previous efforts to solve the problem of automatically adjustable close-coupling between a tow vehicle and trailer structure have dealt primarily, and in some cases solely, with the extension of the hitch motivated by a lateral difference in the longitudinal axes of the tow vehicle and the trailer structure. Such a solution leaves unsolved the problems created by, for example, a sharp horizontal difference in the longitudinal axes of the tow vehicle and the trailer structure, such as occurs when the truck backs the trailer across a not uncommon gully or deep depression.

The main object object of this invention, therefore, is to provide a hitch assembly that becomes a permanent part of the towing vehicle, thus eliminating the cost of the presently conventional hitch protuberance that permanently dominates the front end of the preponderance of factory-built structure while having functional validity only during the few hours of delivery.

Another object of this invention is to provide a hitch assembly that, while close coupled when the axes of towing vehicle and trailer structure are aligned, automatically extends to the extent necessary to preclude contact between towing vehicle and trailer structure, thereby allowing the shorter overall length resulting from the close coupling while preventing damage therefrom.

Another object of this invention is to provide a hitch assembly that eliminates the necessity of the conventional 3 to 4 feet of open and unusable space between towing vehicle and trailer presently required for turning tolerances, thus allowing the legal delivery of over 5% more enclosed space within any overall combined-length highway movement regulation.

Another object of this invention is to provide a hitch assembly that provides the means to the non-manual adjustment of the towing vehicle to the trailer for delivery attachment, thereby eliminating the presently conventional time-consuming, dangerous and costly methods of adapting the trailer to the towing vehicle.

Another object of this invention is to provide a hitch assembly that allows the turning of the towing vehicle up to 90 degrees to the longitudinal axis of its attached trailer, thus eliminating the present limited-radius turns and the maneuvering difficulties resulting therefrom.

Another object of this invention is to provide a hitch assembly that provides for double attachment to the front corners of the steel under-frame of the trailer structure, the logical towing support points, thus obsoleting the single center hook-up with its not uncommon buckled siding above the hitch.

Another object of this invention is to provide a hitch assembly that contains a sensor system to prevent contact between the towing vehicle and the trailer, thus eliminating the common problem of damaged siding due to the towing vehicle exceeding the restricted turn limits on presently conventional hitches and contacting that siding.

These together with other objects and advantages will become apparent in the details of construction and operation as hereinafter described in conjunction with the drawing herein which, by way of illustration, shows preferred embodiments of the present invention although it should be understood that equivalent principles may be used and structural changes may be made by those skilled in the art without departing from the scope of the present invention and appended claims.

In the drawing:

FIG. 3 is a fragmentary plan view taken along line 3—3 of FIG. 7 of the horizontally telescoping mechanism portion of the hitch assembly.

FIG. 4 is a vertical sectional view of one of the sensing mechanism located at each rear vertical corner of the hitch assembly support complex.

FIG. 5 is a horizontal sectional enlarged view taken along line 5—5 of FIG. 4 of that sensing mechanism.

Figures 1, 2:
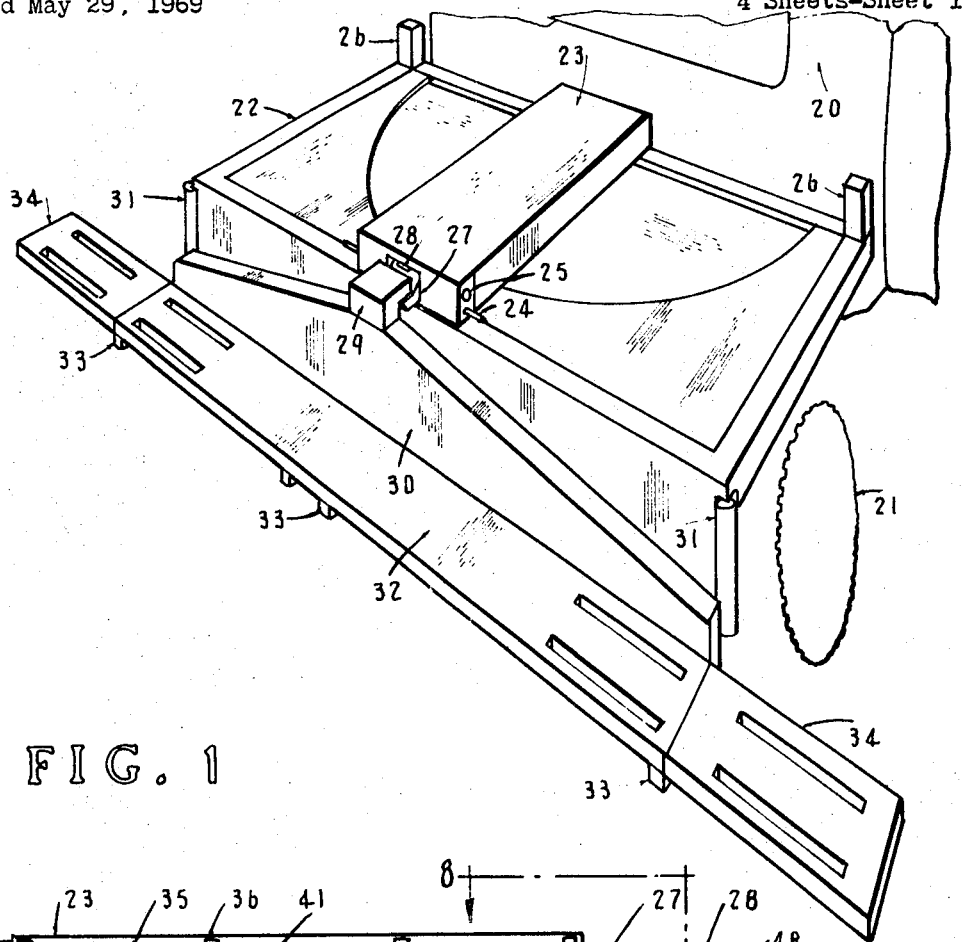
FIG. 1 is a perspective view of the hitch assembly and support complex over and behind the rear wheels of a trailer towing vehicle.
FIG. 2 is a longitudinal vertical sectional view taken along line 2—2 of FIG. 7 of the horizontally telescoping mechanism portion of the hitch assembly.

Referring to the drawings, FIG. 1 shows a conventional towing vehicle 20 having rear wheels 21 (only one shown). A platform 22 is mounted on vehicle 20 to support a horizontally turning hitch enclosure 23. A turn limit warning sensor 24 and a turn limit vehicle brake sensor 25 are mounted opposite lateral side of enclosure 23 so as to be engageable with limit posts 26 mounted on the forward corners of platform 22.

A support beam 27 is movably mounted on platform 22, and carries a safety chain anchor 28. As shown in FIG. 2, a support base 29 is releasably connected to beam 27. A transverse truss 30 is carried by base 29 so as to be movable with beam 27 toward the rear corners of towing vehicle 22. A sensor bar 31 is mounted at each rear vehicle corner.

An elongated carrier 32 is carried by support base 29. Carrier 32 carries a pair of support skids 33, and is suited for connection to a trailing vehicle. A pair of extensions 34 are mounted on the ends of carrier 32.

Figure 6:
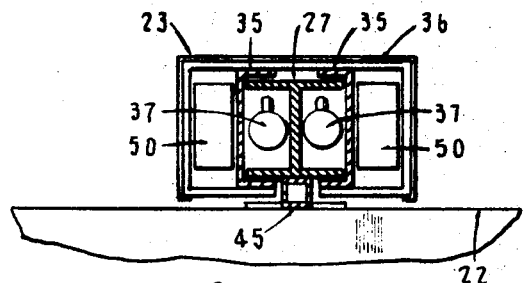
FIG. 6 is a transverse vertical sectional view taken along line 6—6 of FIG. 8 through the horizontally telescoping hitch assembly.

As best shown in FIGS. 2 and 6, a pair of spaced channels 35 are supported by bars 36 in enclosure 23 to form a support for beam 27. A double-acting hydraulic cylinder 37 has a piston 38 connected to beam 27 by web 39. A supply hose 40 is connected to one end of cylinder 37 for extending piston 38, and a supply hose 41 is connected to the other end of the cylinder for retracting the piston. A thrust plate 42 is pivotally connected by pin 43 to an angle extension 44 mounted on platform 22. Cylinder 37 is connected to plate 42 such that as piston 38 is extended and retracted, the beam 27 is moved, respectively, away from and toward pin 43. Thus cylinder 37 is operative to move carrier 32 either toward or away from towing vehicle 20.

A shim 45 supports beam 27 on platform 22 for movement about pin 43 in approximately a 180° arc. An L key 46 is carried by channels 35, and is engaged with semi-circular reverse L47 on platform to restrain the beam against upward motion.

A socket 48 on support base 29 detachably receives a ball 49 mounted on beam 27 to allow a trailing structure mounted on carrier 32 to pivot vertically with respect to towing vehicle 20. It can also be seen that the pivotal connection of beam 27 allows the trailing structure to swing from a rearward position toward positions on opposite lateral sides of vehicle 20.

Figure 7:
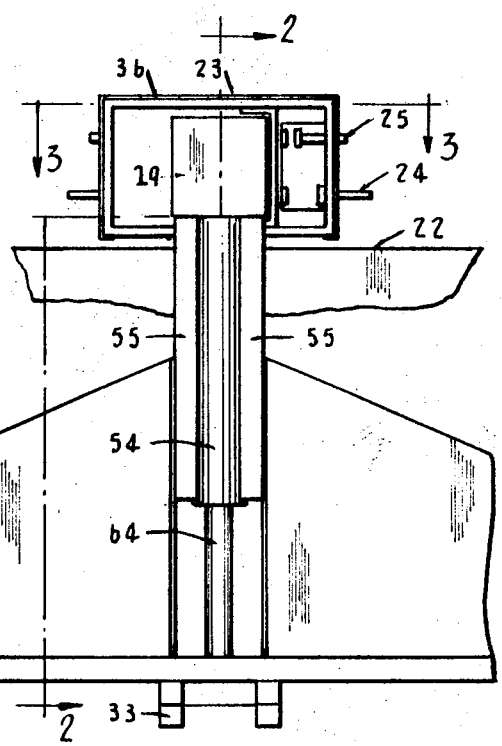
FIG. 7 is a fragmentary elevational view of the back end of the hitch assembly.
Figure 8:
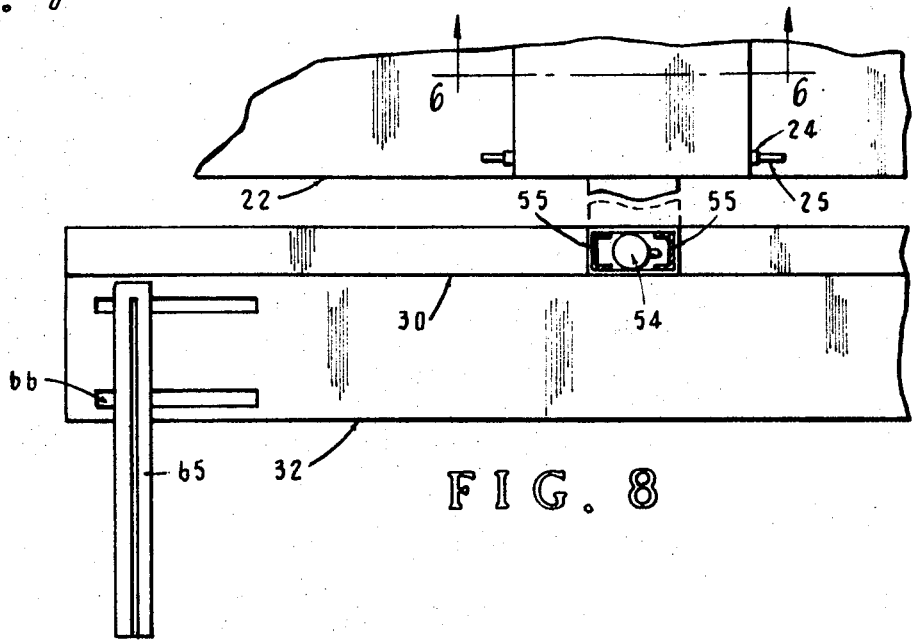
FIG. 8 is a fragmentary plan view taken along line 8—8 of FIG. 2 of the vertically of the vertically telescoping mechanism portion of the hitch assembly.

As best shown in FIG. 3, a hydraulic pump 50 is connected by supply hoses 40 and 41 to cylinder 37 so as to be operative for supplying hydraulic fluid to the cylinder to extend or retract beam 27. As best shown in FIGS. 3 and 7, a pair of hydraulic lines 52 and 53 connect a second hydraulic cylinder 54 to pump 51. Cylinder 54 is carried between a pair of telescope channels 55 which are housed in truss 30. Cylinder 54 is connected to support base 29, and a piston 64, carried by cylinder 54, is connected to carrier 32 so as to be operative to either raise or lower carrier 32 and truss 30.

Referring to FIGS. 4 and 5, sensor bar 31 is rotatably mounted on structure 56 by axle 57 and nut 58. An electrical contact 59 is mounted adjacent the upper end of axle 57. A spring 60 is disposed between a second electrical contact 61 which is carried on the upper end of axle 57 and a third electrical contact 62 is between the other two contacts. Contact 62 is movable with sensor bar 31 between contact 59 and 61 and spring 60 biases contact 62 toward engagement with contact 61.

Figure 9:
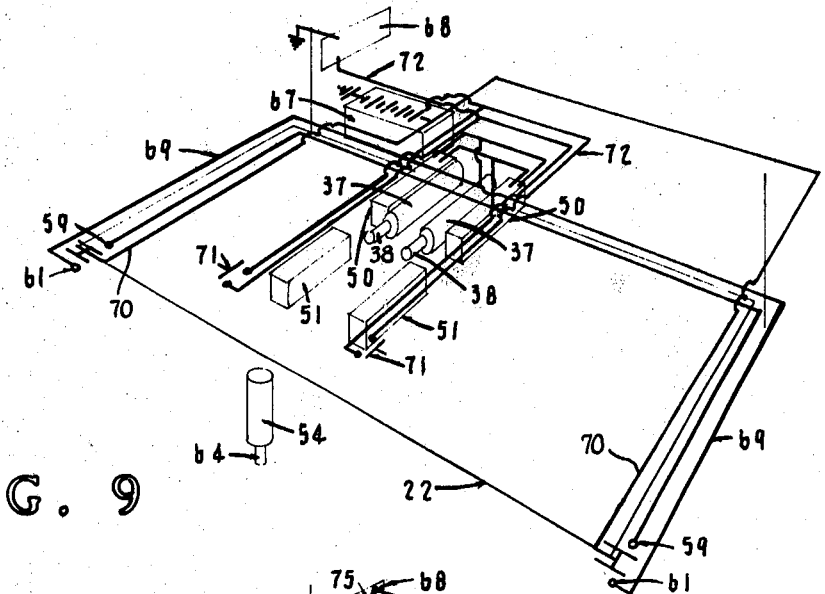
FIG. 9 is a perspective view of the automatic sensor electrical diagram.
Figure 10:
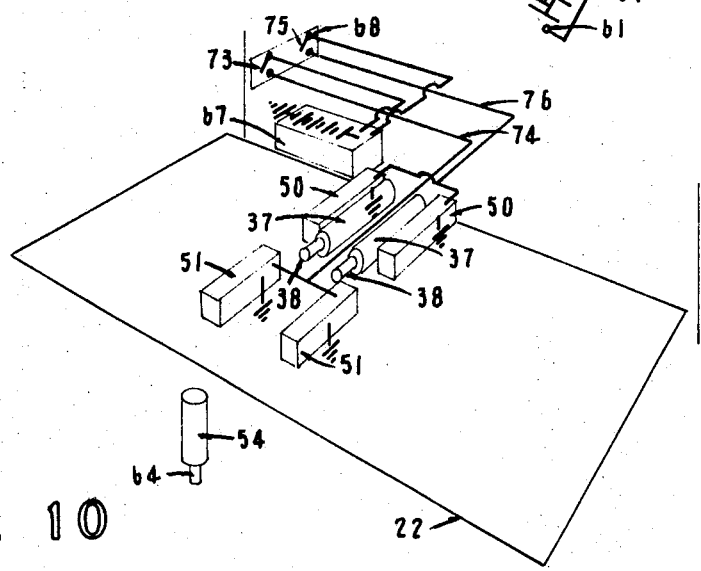
FIG. 10 is a perspective view of the manual electrical diagram for horizontal and vertical extension and retraction.
Figure 11:
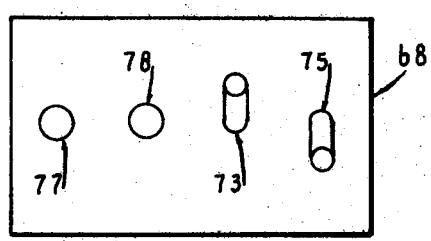
FIG. 11 is an elevational view of the system warning and control panel.

Referring to FIG. 9, a battery 67 is connected by wiring systems 69 and 70 to contacts 59 and 61 so as to be operative to automatically either extend or retract piston 38 depending upon the position of sensor bar 31. When the system is energized and the contact 62 is engaged with contact 61, the cylinder 37 biases the beam 27 toward its fully retracted position. As shown in FIG. 5, if the truss 30 should engage the sensor bar 31 so as to move contact 62 away from contact 61 and into engagement with contact 59, cylinder 37 is operative to extend piston 38 and thereby extend beam 27 rearwardly from its position in enclosure 23.

As best shown in FIG. 9, an activator switch 73 is connected by wiring 74 to allow a user to manually control pump 51 in order to raise or lower carrier 32, and activator switch 75 is connected by wiring 76 to allow the user to manually control pump 50 to extend and retract beam 17.

In operation, the towing vehicle 20 backs up to the center front of the trailer structure and the driver extends the support platform 32 with switches 73 and 75 as necessary to insert platform 32 under the end of the trailer structure. The adaptor 65 is attached to the trailer structure, width variation being compensated for by adaptor attachment slots 66.

It is necessary to lock that trailer structure to the supporting platform 32 in a manner that will not allow the in-transit relationship to change between the trailer structure and said platform 32. The plane of the platform 32 and the floor of the trailer structure must be maintained parallel to each other to prevent the forward swing of the support assembly about the ball 49. Such a forward pivoting of platform 32 under a load would obviously bring truss 30 into contact with sensors 31, extending support arm 27 and allowing the front center area of the trailer structure to be damaged by support base 29.

The configuration and length of the adaptor 65 will, of necessity, vary to accommodate the different frame types, the most common of which are I beam, tube, and open truss. The exact detail of the adaptor is not shown as it is not germane to this concept.

The supporting platform 32 is brought to desired height by switch 73, conventional brake, brake light, turn and other required transit light wiring is hooked up, and safety chains attached.

The towing vehicle 20 is started and, as soon as movement is initiated on the straightaway, the horizontal support beam 27 is fully retracted by piston 38 in cylinders 37 through pressure supply hose 41 from supply pumps 50 activated by turn sensor retractor wiring system 70 through contact 61.

While the longitudinal axes through the towing vehicle and trailer structure remain aligned, the distance between the towing vehicle and the trailer structure will remain minimal. To the degree that a change occurs in the horizontal angle between said axes, the space between the towing vehicle and the trailer structure is increased to prevent contact. Thus, as the angle increases and contact between the front of the truss 30 and the sensor bar 31 remains, the support beam 27 continues to extend. When the angle of turn decreases and the contact between the truss 30 and the sensor bar 31 ceases, the support beam 27 retracts, drawing the towing vehicle and trailer structure back together.

Vertical changes in angle are compensated for by the socket 48 and ball 49 at the back end of support beam 27. Any lessening of the angle between the front face of the truss 30 and the sensor bars 31 will obviously bring them into contact and extend said support beam 27. Thus, any change in the vertical angle between said axes, as with said towing vehicle and trailer structure traveling over the sharp brow of a hill, will be automatically compensated for, preventing contact between said towing vehicle and trailer structure.

While I have shown in the drawing and described in detail one preferred configuration of my invention, I do not limit myself to the exact details of material, design, assembly or use as herein set forth by way of illustration, as it is obvious that numerous changes and variations could be made therein by those skilled in the art without departing from the spirit and scope of my invention or exceeding the scope of the appended claims.

I claim:

1. A device for the close coupling of a trailer structure to a towing vehicle, comprising a horizontal member to support the end of said trailer and attachments to secure said trailer thereto, a vertical structural member connected to and supporting said horizontal member, a horizontal member pivotally attached to and supporting said vertical structural member, said latter horizontal member telescopically inserted into one end of a larger horizontal member, the closed end of said larger member being pivotally affixed to a supporting platform allowing the lateral swing upon said platform of said telescoping horizontal members and structure attached thereto, the extension and retraction of said smaller horizontal member within larger horizontal member motivated by pistons thrust extensibly and retractably hydraulically within cylinders by pumps connected thereto, said pumps activated by sensors at the rearmost corners of said towing vehicle, said sensors activated by an extension of said supporting platform by any change in relationship between towing vehicle and trailer structure in a manner continuously automatically preventing contact between said towing vehicle and trailer structure.

2. A device for the close coupling of a trailer structure to a towing vehicle according to claim 1, said laterally swinging larger horizontal member having attached thereto at both sides near its open end, turn limit sensors comprising laterally extended electrical contacts, springs holding said contacts in extended position, opposing contacts aligned with said extended contacts, limit posts at the front corners of said supporting platform positioned to depress said extended contacts into said opposing contacts, closing an electrical circuit to a warning signal in the cab of said towing vehicle when the lateral angle between said towing vehicle and said trailer structure approaches that angle allowing contact and damage.

3. A device for the close coupling of a trailer structure to a towing vehicle according to claim 1, said laterally swinging larger horizontal member having attached thereto at both sides near its open end, turn limit sensors comprising laterally extended electrical contacts, springs holding said contacts in extended position, opposing contacts aligned with said extended contacts, limit posts at the front corners of said supporting platform positioned to depress said extended contacts into said opposing contacts when the lateral angle between said towing vehicle and said trailer structure exceeds the angle of which said warning contacts are closed, closing an electrical circuit to the brake system of said towing vehicle, closing an electrical circuit to a brake warning signal in the cab of said towing vehicle, stopping said towing vehicle before contact and damage between said towing vehicle and said trailer structure.

4. A device for the close coupling of a trailer structure to a towing vehicle as in claim 1, said vertical structural member comprising a socket means of attachment to said smaller horizontal member, spaced channels forming an open-sided cavity projecting downward from said socket, a cylinder attached within said cavity, a piston thrust extensibly and retractably hydraulically within said cylinder, the lower end of said piston attached to said horizontal trailer-supporting member, extension and retraction hydraulic pressure supply hoses attached to and extending from said cylinder in said vertical cavity to a pressure supply pump beside the open end of said large horizontal member, said pressure supply pump activated electrically from controls in the truck cab.

5. A vehicle structure, comprising:
   (a) a towing vehicle;
   (b) a hitching member pivotally mounted on the towing vehicle so as to be movable from a retracted position toward an extended position;
   (c) a carrier suited for connection to a trailing vehicle, the carrier being releasably connected to the hitching member;
   (d) power means connected to the hitching member for moving it from said retracted position toward said extended position; and
   (e) a sensor connected to the power means so as to be movable toward a first position in which the power means is operative to move the hitching member toward its retracted position, and toward a second position in which the power means is operative to move the hitching member toward its extended position, the sensor being mounted so as to be actuated by a motion of the carrier with respect to the towing vehicle, whereby the hitching member is moved toward its extended position as the carrier is moved toward a lateral position with respect to the towing vehicle, and is moved toward its retracted position as the carrier is moved away from said lateral position.

6. A vehicle structure as defined in claim 5, including second power means connected between the hitching member and the carrier to move it from an upper position toward a lower position.

7. A vehicle structure as defined in claim 5, including means for actuating the power means so as to move the hitching member toward its retracted position without pivoting the hitching member with respect to the towing vehicle.

References Cited

UNITED STATES PATENTS

| | | | |
|---|---|---|---|
| 2,328,387 | 8/1943 | Meats | 280—438 |
| 2,485,371 | 10/1949 | Duffy | 280—446 |
| 2,640,710 | 6/1953 | Duffy | 280—446 |
| 2,714,018 | 7/1955 | Colpo | 280—438A |
| 3,244,434 | 4/1966 | Reed et al. | 280—446 |

LEO FRIAGLIA, Primary Examiner